United States Patent Office 2,880,460
Patented Apr. 7, 1959

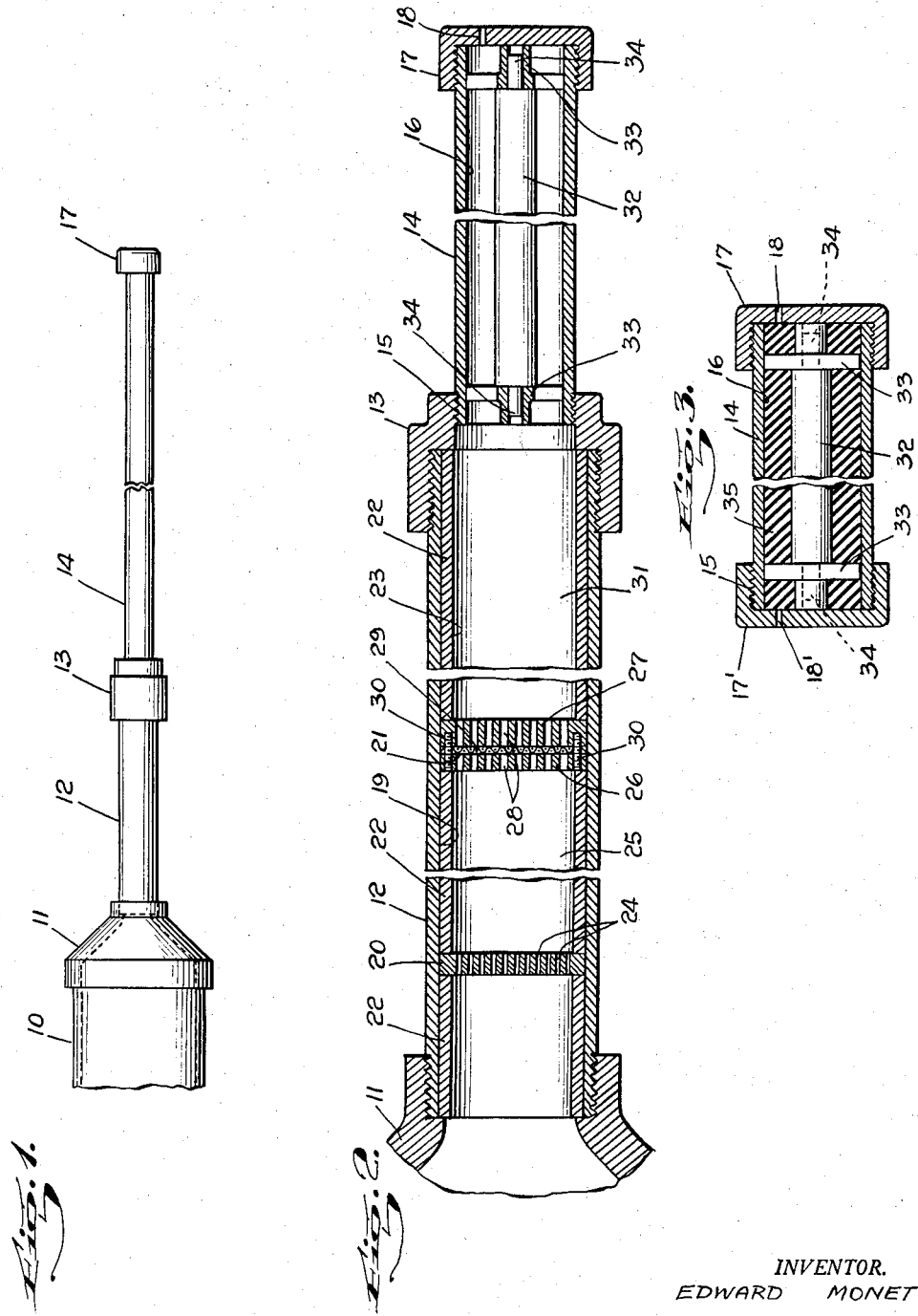

2,880,460
APPARATUS FOR MOLDING RUBBER PRODUCTS

Edward Monett, Westfield, N.J.

Application April 13, 1956, Serial No. 577,988

4 Claims. (Cl. 18—30)

This invention relates to the production of rubber products such, for example, as rubber or synthetic rubber rolls. More particularly, the invention deals with an apparatus of the character defined, wherein the crude material is fed by hydraulic or other pressure through an air freeing and screening station and, thus, into a mould having a bleeder end for releasing the air and part of the material in the pressure feed of the machine into the mould in forming a predetermined product, which may be arranged upon a core.

Still further, the invention deals with the removal of the mould from the screening station and capping the ends of the mould, preparatory to placing the same in a heater to cure or vulcanize the product, after which, the product is removed from the mould and trimmed to produce the final end product.

Still more particularly, the invention deals with an apparatus, wherein the air freeing and screening station comprises a substantially one diameter tubular body, in which one or more screening discs are arranged.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic side view of part of an apparatus made according to my invention, with part of the construction broken away.

Fig. 2 is an enlarged broken longitudinal section through the structure shown in Fig. 1, with part broken away; and Fig. 3 is a broken section through the capped die or mould structure, preparatory to the vulcanizing process.

In order to illustrate one adaptation and use of my invention, I have shown, in the accompanying drawing, the production of a rubber roller which includes a spindle or core, in other words, rollers used in printing and other industries, wherein the spindle or core serves to mount the roller in connection with any type and kind of apparatus. At this time, it will also be pointed out that, in referring to rubber, it is intended that this should cover any type and kind of rubber compound, including many synthetics such, for example, as "neoprene," "silicone" and many others.

In Fig. 1 of the drawing, I have indicated at 10 the discharge end portion of a hydraulic cylinder, into which the raw material employed in the process is arranged, this material varying in consistency from a relatively light to a substantially heavy or viscose character and the material is pressure discharged through a contracted end 11 on the cylinder into a long tubular member 12 which, for purposes of description, will be designated as the air relief and screening station of the apparatus. At the other end of the tubular member 12 is secured a fitting or coupling 13, with which the die or mould 14 is directly coupled, as seen at 15. The die or mould 14 has a highly polished inner surface 16, so as to produce, on the finished product, an extremely smooth and more or less glass-like surface. To the free end of the die or mould 14 is secured a cap 17 having an air discharge aperture and/or sprue 18.

The tubular member 12 of the air freeing and screening station has a common diameter bore 19 extending the full length thereof, in which one or more screening discs are arranged. In the construction shown, two screening discs 20 and 21 are illustrated and these discs are spaced longitudinally of the tubular member 12 by spacing or liner sleeves 22, all of which are of the same diameter; thus producing, by said spacer and liner sleeves, a one diameter bore 23 through the member 12, which bore is interrupted only by the discs 20, 21.

The disc 20 has a multiplicity of very fine apertures 24 extending therethrough, the size of the apertures being exaggerated in the illustration for sake of clarity. The disc 20 is employed to screen-out any foreign particles which might prevail in the raw material, so as to insure that such particles do not reach the die or mould 14. Further, this disc 20 serves to break-up the mass into a multiplicity of fine strand-like sprues which pass into the chamber 25 immediately beyond the disc 20, thus freeing any air which might prevail or be trapped in the material for discharge ultimately through the aperture 18. With many types of materials, the single disc 20 can be used and the material from the chamber 25 would then pass directly into the die or mould 14. In such instances, the tubular member 12 can be shorter in length than when a second disc, such as the disc assemblage shown at 21, is employed.

The disc assemblage 21 comprises two apertured discs 26 and 27, preferably having alined or registering apertures 28 which are considerably larger than the apertures 24 of the disc 20 and disposed between the discs 26 and 27 is a fine mesh screen 29 clamped between the two discs by screws 30 which couple the discs in making the disc assemblage 21. Here again, it will be apparent that, as the material is pressure fed through the chamber 25, it will then pass through the apertures 28 of the discs 26 and 27, as well as through the screen 30, the latter, together with the apertures, further breaking-up the material in its passage into the chamber 31. Here again, any air which may still remain in the material will be permitted to escape and be discharged through the aperture 18 and the material from the chamber 31 is pressure fed into the bore 16 of the die or mould 14 and, finally, the material itself, after being subjected to the compactness of the pressure medium employed, is itself discharged through the aperture 18 and, as and when this occurs, the material within the die or mould 14 will be fully compacted and be ready to receive the curing or vulcanizing treatment in the production of the desired moulded end product.

In the present illustration, namely the production of rollers, a spindle or core 32 is supported in the die or mould 14 by arranging spiders 33 upon the reduced end portions 34 of the core or spindle so as to axially centralize the core or spindle 32 in the bore 16 of the die or mould 14. It will be apparent that the spiders will allow the free passage of the material into the die or mould and around the core, as well as into the cap 17.

After the die or mould has been filled with the moulding material under the high pressure and compactness, as stated above, the die or mould 14 is detached from the coupling or fitting 13 and, then, another end cap 17', generally similar to the end cap 17, is mounted on the detached end of the mould after trimming off the material at the end of the mould and the assemblage thus produced, as diagrammatically shown in part in Fig. 3 of the drawing, is placed in a vulcanizing apparatus and heated at temperatures of 250° F. or more in setting or curing the material in production of the final end product. In this last named operation, the material within the die or mould 14 is expanded and a portion thereof is discharged through the sprue passage 18, as well as the sprue passage 18' of the cap 17'. Upon completion of the vulcanizing process, the end caps 17, 17' are removed from the die or mould and the moulded product then discharged from the die or mould 14. The product is then trimmed and the spiders 33 removed, leaving a finished rubber roller 35 on the core or spindle 32.

With certain types and kinds of products, it is desirable to coat or cover the core or spindle 32 with a material which will establish adhesion of the rubber of the roller 35 with the spindle. However, with other materials, the moulding process will fixedly adhere the moulded rubber body upon the core which, when used as a spindle, would not have the highly polished and smooth surface. In this connection, it will also be understood that, where it is desirable to produce a tubular product, then the core or spindle would be highly polished, similar to the high polish of the bore 16 of the die or mould 14 and the core would be removed from the resulting end product after the vulcanizing process.

In the vulcanizing process and by providing the sprue passages 18, 18', assurance is provided for relief of all excess material, avoiding any stress or strain upon the die or mould 14, the sprues 18, 18' being relatively fine sprues and, in this connection, it will be understood that a supplemental end cap 17 can be used, having a finer sprue passage 18 than the air vent passage which would be provided in the initial use of the cap 17. On the other hand, a larger aperture 18 could be plugged with a plug having a finer sprue passage therein.

By providing the one diameter bore 23 through the several liners 22, a very positive and definite control of the material is provided prior to pressure discharge into the bore 16 of the die or mould 14. It will also be apparent that various types and kinds of dies or moulds can be coupled with the end coupling or fitting 13, particularly with respect to diameters and lengths, it being understood that the couplings or fittings 13 can vary as to size without modification of the general structure of the station formed by the tubular member 12 and its associated parts. In some instances, more than two of the disc assemblages 21 can be employed. However, I have found that, with most crude materials, the combination of the discs 20, 21 produce the best results; whereas, in some few instances, with certain kinds of materials, the single disc 20 alone is sufficient.

With my improved process, the several discs 20, 21 employed also operate to more thoroughly amalgamate the crude material employed, preparatory to passage into the cavity defined by the bore 16 of the die or mould 14 and, in carrying out the process, after a complete compactness of the material has been established in the cavity of the die or mould, the pressure medium is shut-off and the die or mould detached, as previously stated. In this connection, it will be understood that, in making several runs of the same material, another die or mould is attached to the station 12; whereupon, the pressure medium is again energized to fill the next successive die or mould and this operation will continue until a predetermined run of the machine or apparatus is completed. From time to time, the cylinder 10 will be replenished with additional crude material. It will be understood that, in the present diagrammatic showing, all supports for the various parts of the apparatus are omitted for simplicity in the showing.

It will be apparent that the showing of the bleeder or sprue apertures 18, 18' in Fig. 3 of the drawing are highly exaggerated, as these apertures, in actual fact, are very small and simply provide a relief of a small quantity of the material during the vulcanizing process as and when internal pressures build up in the mould, thus assuring that the moulded portion of the roller body 35 is finally formed in a highly compacted state upon the core or spindle 32.

In the operation of the apparatus, namely in the pressure injection of the crude material into the station 12, it will be understood that the material is in a more or less solid mass in its arrangement in the hydraulic cylinder 10 and, while this mass is substantially air free, at times, there are bubbles or the like of trapped air, which bubbles are released in the initial operation of pressure injection into the station 12 and, ultimately, into the mould, particularly when the material is broken up by the screening discs employed and this air is discharged through the opening 18 as the material advances through the system.

It will be apparent, however, that, as the process continues and the material builds up in the chambers 25 and 31, this minute existence of air is not released until the final vulcanizing process, at which time, when the pressure builds up in the mould by virtue of the heating of the mould, air will be released through the very fine bleeders 18, 18', as well as a small portion of the moulded material. It will, thus, be apparent that the resulting end product will be substantially free of any entrapped air, thereby facilitating the production of end products having the positive control as to size, contour and finish.

At this time, it is also pointed out that, while, in the accompanying drawing, the disc 20 is shown in advance of the disc 21, it will be understood that, with some types and kinds of materials, it would be advantageous to position the disc 21 in advance of the disc 20 and this is especially desirable as and when the crude product is likely to contain considerable amount of foreign matter, so that the foreign matter can be checked by the screen 29, which screen is more readily cleanable by separation of the discs 26 and 27 and cleaning or replacement of the screen 29. Furthermore, the larger apertures of the discs 26, 27 are more readily cleanable than the finer apertures 24 of the discs 20.

Having fully described my invention, what I claim as new and desire to secure by Letters Patent is:

1. An apparatus for producing moulded rubber products, comprising an air freeing and screening station, said station including a one diameter tubular member extending substantially the full length of said station, means coupled with one end of said member for directing pressure fed crude material into one end of said station, a mould having one end coupled with the other end of said member, said mould having a cavity partially defining the product to be formed, a screening disc in said member intermediate its ends, means for supporting said disc in said member and maintaining a one diameter bore through said station at opposed sides of said disc, said disc having a multiplicity of small holes extending therethrough, a cap mounted on the other end of said mould, and said cap having a vent aperture communicating with the cavity of said mould.

2. An apparatus for producing moulded rubber products, comprising an air freeing and screening station, said station including a one diameter tubular member extending substantially the full length of said station, means coupled with one end of said member for directing pressure fed crude material into one end of said station, a mould having one end coupled with the other end of said member, said mould having a cavity partially defining the product to be formed, a plurality of screening means arranged at spaced intervals in said member, means comprising one diameter sleeves arranged directly in said member for spacing said screening means in said member, one of said screening means comprising a disc having a multiplicity of small diameter apertures therein, the other screening means comprising a pair of apertured discs with a fine mesh screen supported between said discs, a cap mounted on the other end of said mould, and said cap having a vent aperture communicating with the cavity of said mould.

3. In an apparatus employing means for directing pressure fed crude material for compacting in the cavity of a mould, an air freeing and screening station interposed between and secured to said means and mould, through which said material is pressure fed, said station comprising an elongated one diameter tubular member, screening means arranged directly in said member, sleeve liners mounted directly in said member for positioning the screening means in spaced relation to ends of said member, said liners providing a one diameter bore through said station at opposed sides of said screening means, said screening means serving to free air from the material in its passage through said station and amalgamating the material prior to being compacted in the cavity of said mould, and said mould having a discharge aperture communicating with the cavity thereof for discharge of air and part of the compacted material in the operation of pressure compacting material in said cavity.

4. In an apparatus employing means for directing pressure fed crude material for compacting in the cavity of a mould, an air freeing and screening station interposed between and secured to said means and mould, through which said material is pressure fed, said station comprising an elongated one diameter tubular member, screening means arranged directly in said member, sleeve liners mounted directly in said member for positioning the screening means in spaced relation to ends of said member, said liners providing a one diameter bore through said station at opposed sides of said screening means, said screening means serving to free air from the material in its passage through said station and amalgamating the material prior to being compacted in the cavity of said mould, said mould having a discharge aperture communicating with the cavity thereof for discharge of air and part of the compacted material in the operation of pressure compacting material in said cavity, and said screening means comprising an assemblage of two apertured discs with a mesh screen supported therebetween.

References Cited in the file of this patent

UNITED STATES PATENTS

| | | |
|---|---|---|
| 1,745,482 | Goodwin | Feb. 4, 1930 |
| 2,301,338 | Smith | Nov. 10, 1942 |
| 2,543,679 | Van Riper | Feb. 27, 1951 |
| 2,615,207 | Dickey | Oct. 28, 1952 |